(12) United States Patent
Brewerton (10) Patent No.: US 11,338,868 B2
(45) Date of Patent: May 24, 2022

(54) VARIABLE AERODYNAMIC DEVICE

(71) Applicant: McLaren Automotive Limited, Surrey (GB)

(72) Inventor: Matthew Peter Brewerton, Guildford (GB)

(73) Assignee: McLaren Automotive Limited, Woking (GB)

( * ) Notice: Subject to any disclaimer, the term of this patent is extended or adjusted under 35 U.S.C. 154(b) by 77 days.

(21) Appl. No.: 16/869,444

(22) Filed: May 7, 2020

(65) Prior Publication Data

US 2020/0353998 A1 Nov. 12, 2020

(30) Foreign Application Priority Data

May 10, 2019 (GB) ...................................... 1906636

(51) Int. Cl.
*B62D 35/00* (2006.01)

(52) U.S. Cl.
CPC .................................. *B62D 35/007* (2013.01)

(58) Field of Classification Search
CPC .................................................. B62D 35/007
See application file for complete search history.

(56) References Cited

U.S. PATENT DOCUMENTS

| | | | |
|---|---|---|---|
| 2007/0063541 A1 | 3/2007 | Browne et al. | |
| 2007/0145776 A1 | 6/2007 | Grave et al. | |
| 2007/0236046 A1 | 10/2007 | Froeschle et al. | |
| 2017/0374300 A1* | 12/2017 | Gimena | B60J 1/00 |
| 2019/0176909 A1* | 6/2019 | Slight | B62D 35/007 |
| 2019/0233022 A1* | 8/2019 | Biancalana | B62D 35/005 |

FOREIGN PATENT DOCUMENTS

| | | | |
|---|---|---|---|
| DE | 102014211292 | | 12/2015 |
| DE | 102016105994 | | 10/2017 |
| FR | 2624823 | | 6/1989 |
| KR | 19990034607 A | * | 5/1999 |
| KR | 20160031320 A | * | 3/2016 |
| WO | WO 2017/123640 | | 7/2017 |

OTHER PUBLICATIONS

Search Report under Section 17, issued in corresponding Application No. GB 1906636.4 dated Oct. 28, 2019, 4 pages.

* cited by examiner

*Primary Examiner* — Lori L Lyjak
(74) *Attorney, Agent, or Firm* — Fish & Richardson P.C.

(57) ABSTRACT

A vehicle, comprising: a vehicle body having a rear; and a variable aerodynamic device positioned at the rear of the vehicle body and being moveable between a lowered configuration and a raised configuration, the variable aerodynamic device comprising: a wing divided along its length into a middle region and outer regions to either side of the middle region, the wing having a reduced width within the middle region relative to the outer regions, and the wing forming part of an outer surface of the vehicle body when the variable aerodynamic device is in the lowered configuration and raised from the vehicle body when the variable aerodynamic device is in the raised configuration.

20 Claims, 5 Drawing Sheets

VARIABLE AERODYNAMIC DEVICE

CROSS-REFERENCE TO RELATED APPLICATIONS

This application claims priority to UK Patent Application Serial No. 1906636.4, filed on May 10, 2019, the entire contents of which are hereby incorporated by reference.

TECHNICAL FIELD

This invention relates to a vehicle comprising a variable aerodynamic device.

BACKGROUND

Many cars are fitted with fixed aerodynamic devices to improve downforce or reduce drag. Some of these can be adjusted and then re-fixed in place whilst the car is stopped. Other cars have aerodynamic devices that can be adjusted whilst the car is in motion. Such aerodynamic devices may be positioned in regions of the car where there is airflow over the car, the path of which can be changed by the aerodynamic devices.

These moveable aerodynamic devices generally move between a retracted configuration to a deployed configuration to provide different aerodynamic effects depending on the position of the moveable aerodynamic device. The aerodynamic device is generally formed of one or more separate wings that can move relative to the body of the vehicle. These wings may stand proud of the vehicle in at least some positions of the aerodynamic device so that air can flow on both sides of the wing(s). When the wings stand proud of the vehicle, they are likely to generate higher downforce on the vehicle or other desirable aerodynamic effects but generally at the expense of higher drag.

The airflow over the car can vary because the shape of the vehicle body can change whether the air continues to flow smoothly over regions of the vehicle body further towards the rear of the vehicle or whether elements of the vehicle body cause disruption to the airflow over the vehicle body. When the aerodynamic device is at the rear of the vehicle such disruptions to the rearward airflow over the vehicle body can affect the performance of the aerodynamic device.

Therefore, it would be desirable to have a vehicle with an improved variable aerodynamic device that makes better use of the aerodynamic properties of the vehicle body.

SUMMARY

According to a first aspect of the present invention there is provided a vehicle, comprising: a vehicle body having a rear; and a variable aerodynamic device positioned at the rear of the vehicle body and being moveable between a lowered configuration and a raised configuration, the variable aerodynamic device comprising: a wing divided along its length into a middle region and outer regions to either side of the middle region, the wing having a reduced width within the middle region relative to the outer regions, and the wing forming part of an outer surface of the vehicle body when the variable aerodynamic device is in the lowered configuration and raised from the vehicle body when the variable aerodynamic device is in the raised configuration.

The wing may have a reduced width within the central region so that, when the variable aerodynamic device is in the raised configuration, the middle region presents a smaller surface area to a rearward airflow than each outer region. The wing may have a variable reduced width within the middle region. The variation of the width of the wing within the middle region may be symmetrical to either side of a longitudinal centreline of the vehicle.

The width of the wing within the middle region may deviate from the width of the outer regions where the outer regions abut the middle region to a minimum width less than the width of the outer regions. The minimum width may be less than the width of the outer regions where the outer regions abut the middle region. The minimum width may be located along the longitudinal centreline of the vehicle.

The wing may have a front edge and a rear edge, and the wing may be shaped so that, within the middle region, the rear edge of the wing deviates towards the front edge of the wing. The front edge of the wing may be substantially straight within the middle region. The reduced width of the wing within the middle region may form a notched shape in the rear edge of the wing.

When the variable aerodynamic device is in the raised configuration and the vehicle is moving in a forward direction, the outer regions may be subjected to a less disrupted rearwardly moving airflow than the middle region. The vehicle body may be shaped so that, when the vehicle is in forward motion, the vehicle body generates a less disrupted rearwardly moving airflow over the outer regions of the wing than over the middle region of the wing. The vehicle may have a front, and the vehicle may comprise a device located at the front of the vehicle which, when the vehicle is in forward motion, generates a stream of air which disrupts a rearwardly moving airflow over the vehicle body so that the outer regions are subjected to a less disrupted rearwardly moving airflow than the middle region. The reduced width within the middle region may form an aperture in the vehicle body, and the vehicle may comprise an exhaust outlet located in the aperture. The vehicle may comprise two exhaust outlets located in the aperture.

BRIEF DESCRIPTION OF THE FIGURES

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising a vehicle body having a rear and a variable aerodynamic device positioned at the rear of the vehicle body and being moveable between a lowered configuration and a raised configuration. The variable aerodynamic device comprises a wing divided along its length into a middle region and outer regions to either side of the middle region, the wing having a reduced width within the middle region relative to the outer regions, and the wing forming part of an outer surface of the vehicle body when the variable aerodynamic device is in the lowered configuration and raised from the vehicle body when the variable aerodynamic device is in the raised configuration.

Figure 1:
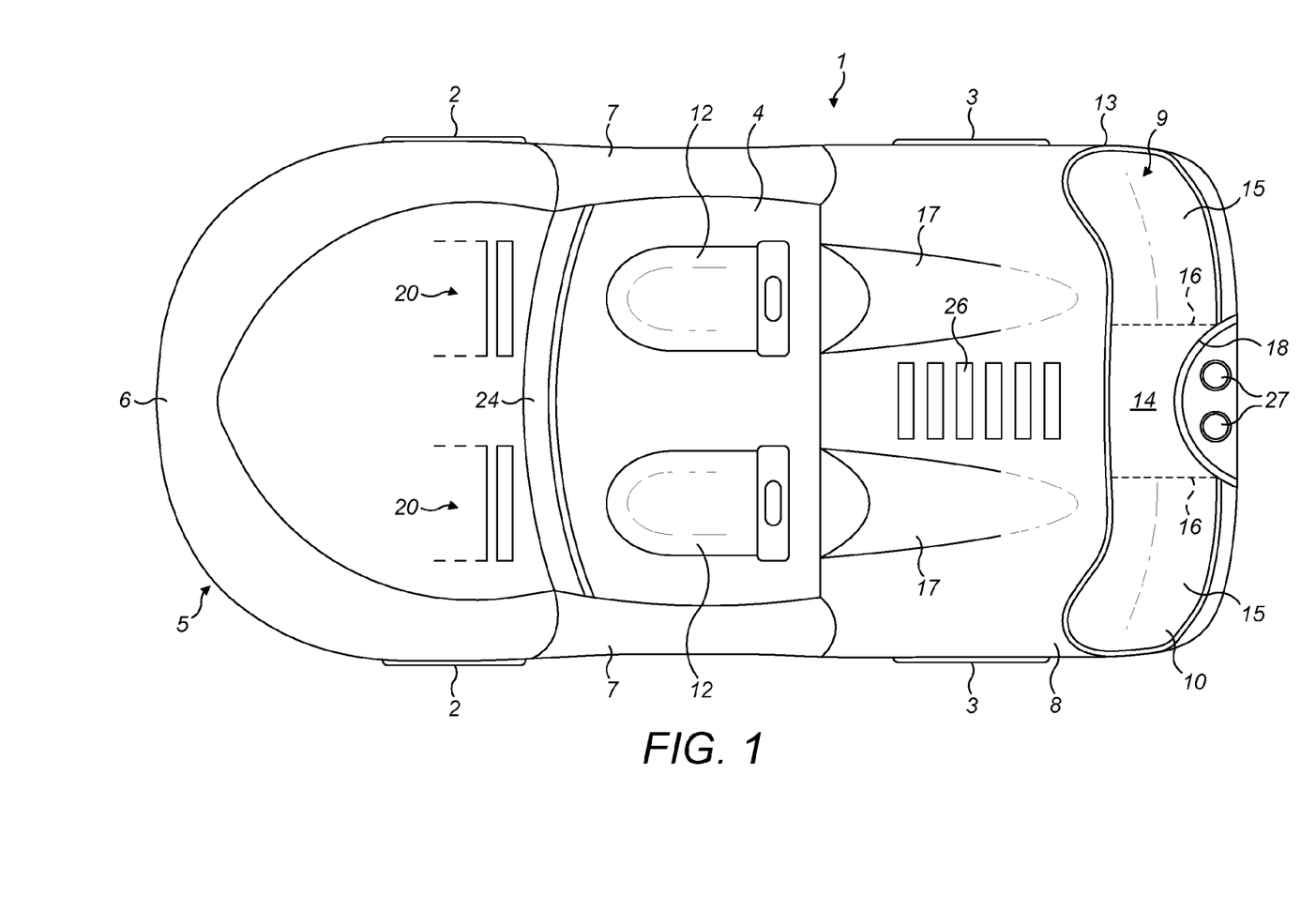
FIG. 1 shows a plan view of a vehicle comprising a rear variable aerodynamic device.
Figure 2:
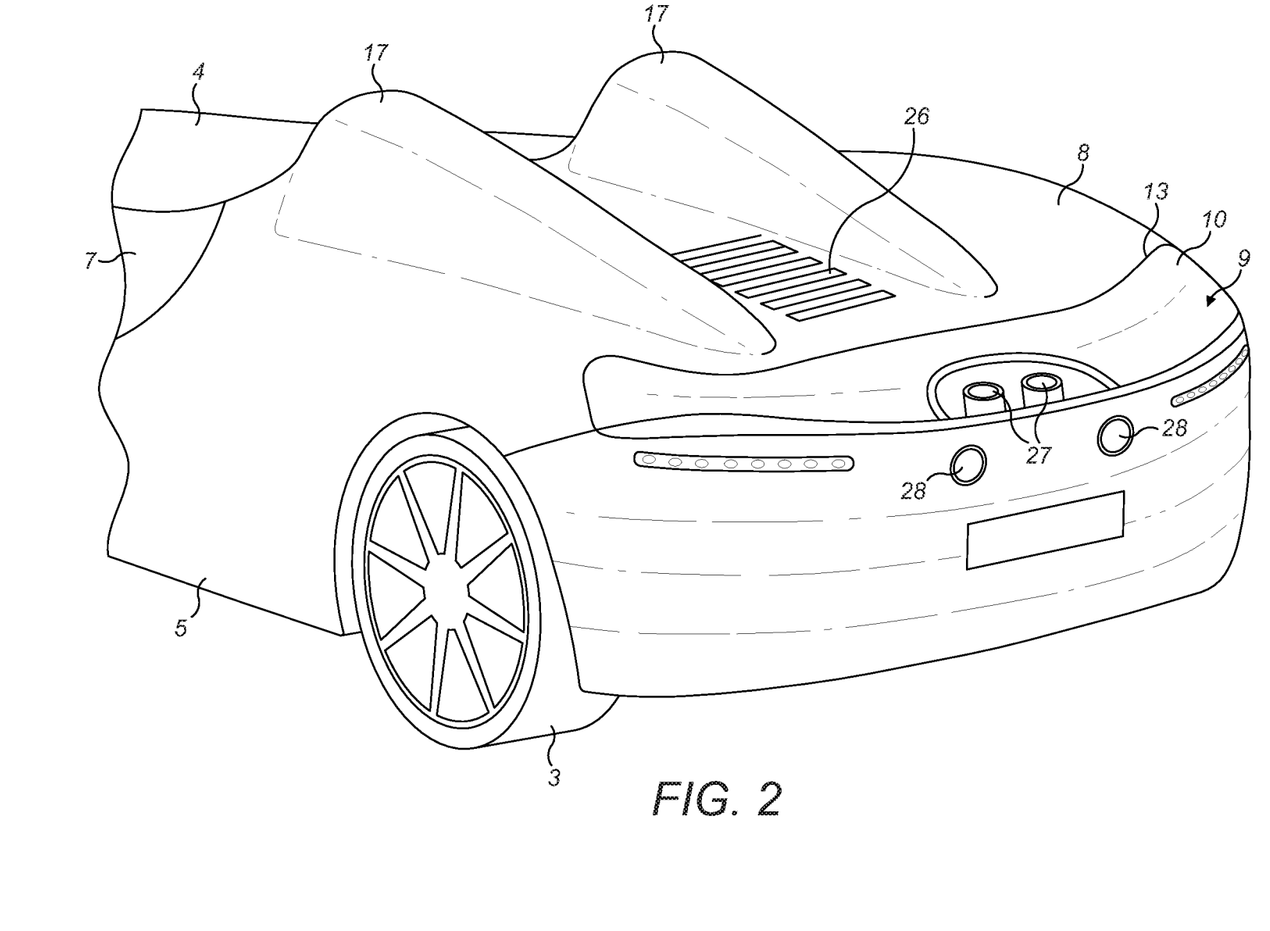
FIG. 2 shows a rear three-quarters view of the vehicle comprising the rear variable aerodynamic device in a lowered configuration.
Figure 3:
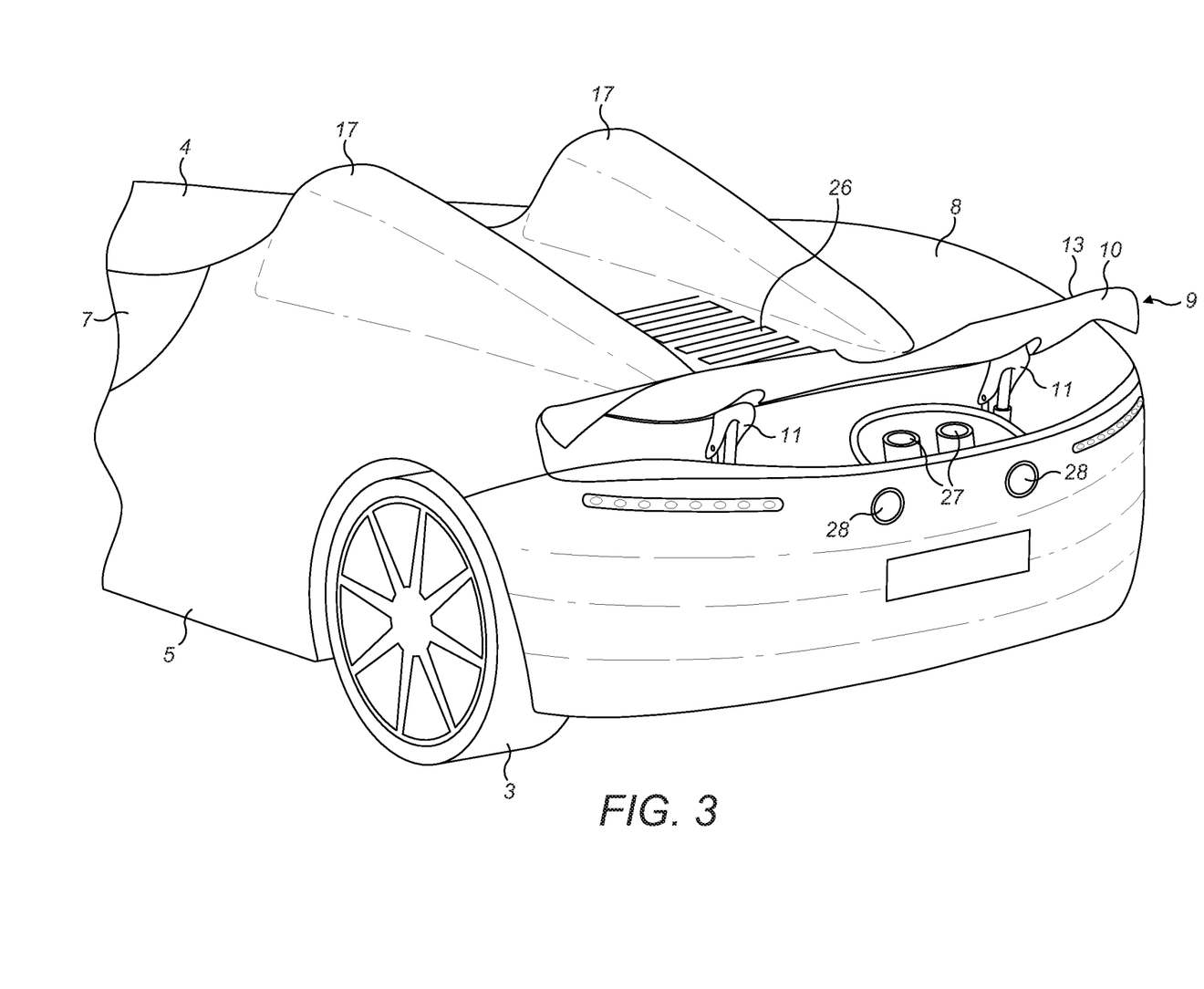
FIG. 3 shows a rear three-quarters view of the vehicle comprising the rear variable aerodynamic device in a raised configuration

FIGS. 1, 2 and 3 show a vehicle 1. The vehicle may be an automobile. The vehicle may be a car. The vehicle comprises front wheels 2 and rear wheels 3. The front of the vehicle 1 is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 12 for occupants of the vehicle to sit in. The occupant compartment 4 may accommodate a driver. The occupant compartment may accommodate one or more passengers. The vehicle 1 may comprise controls located within the occupant compartment 4 to enable an occupant to control the motion of the vehicle. The vehicle pictured in FIGS. 1, 2 and 3 is a roofless vehicle.

The vehicle comprises a vehicle body 5. The vehicle body 5 comprises a plurality of body panels. For example, the body panels may include bonnet panel(s) 10, side door panel(s) 7, and rear deck panel(s) 8. Each of these listed example areas of body panels may be formed of one or more body panels. The vehicle body 5 has an outer surface made up of the outer surface of the body panels. The outer surface of the vehicle body 5 defines the exterior surface of the vehicle 1.

The vehicle comprises one or more variable aerodynamic devices (VADs). As shown in FIG. 1, the vehicle 1 comprises a rear VAD 9. The rear VAD 9 is mounted to the vehicle 1. The rear VAD 9 is mounted at a rear portion of the body of the vehicle 5. The vehicle body 5 may be the collection of parts that form the main structure of the vehicle 1. The rear VAD comprises a wing 10 and an actuation mechanism 11. The actuation mechanism 11 may comprise one or more actuators and linkages as described herein.

The rear VAD 9 is configured to move between a lowered configuration and a raised configuration. The rear VAD 9 is shown in the lowered configuration in FIGS. 1 and 2. The rear VAD 9 is shown in the raised configuration in FIG. 3. The rear VAD may be configured so that it can be controlled to take any position between the lowered configuration and the raised configuration. The position taken by the rear VAD 9 may be selected based on the downforce requirements of the vehicle 1 at a given time.

As shown in FIGS. 1 and 2, the wing 10 forms part of the outer surface of the vehicle body 5 when the rear VAD 9 is in the lowered configuration. The wing 10 has an upper surface which is oriented generally in an upwards direction facing away from the running surface on which the vehicle 1 is supported. As described herein, the wing 10 can rotate when the rear VAD 9 moves between the lowered and raised configurations. Therefore, the upper surface may not point directly upwards in all positions of the wing but nonetheless will generally be primarily oriented in an upwards direction. When the rear VAD 9 is in the lowered configuration, the upper surface of the wing 10 is in line with the upper surface of the surrounding body panels are the edge 13 of the upper surface of the wing 10. Thus, when the VAD is in the lowered position, the wing 10 presents a seamless transition from the rest of the outer surface of the vehicle body 5 surface to a rearwardly flowing airflow over the outer surface of the vehicle body 5.

As shown in FIG. 3, the wing 10 is raised from the vehicle body 5 when the rear VAD 9 is in the raised configuration. In this configuration, a rearwardly moving airflow can pass to both the upper and lower sides of the wing 10. The wing 10 is aerodynamically profiled so that its cross-sectional shape is capable of providing downforce to the rear of the vehicle 1. The wing 10 acts on a rearwardly moving airflow to redirect that airflow to generate downforce at the rear of the vehicle 1. When the wing 10 is raised from the vehicle body 5, the wing 10 presents a surface area against which a rearwardly moving airflow impinges. This surface area of the wing acts on the rearwardly moving airflow to redirect the airflow and generate the downforce. However, the wing 10 also generates drag on the vehicle body due to the vehicle having to push the wing 10 through the air which generates the rearwardly moving airflow. The air resists being redirected by the wing 10 which causes a reaction force on the vehicle 1 a component of which is opposite to the vehicle's motion direction and hence is drag.

Some parts of the rearward airflow, generated when the vehicle 1 is in motion, will be flowing in a relatively straight, non-turbulent fashion across, and close to, the vehicle body 5. This generally occurs where the vehicle body 5 and components of the vehicle 1 act on the airflow in a smooth, continuous manner meaning that the airflow runs smoothly over, and close to, the vehicle 1. For example, around the sides of the vehicle, over the portions of the vehicle body that meet the sides of the vehicle body that are generally upwards facing, and/or over the roof of the vehicle (where present) when the roof provides a continuous smooth profile from the front of the vehicle to the rear of the vehicle. In general, these tend to be regions at the lateral edges of the vehicle body.

Other parts of the rearward airflow, generated when the vehicle 1 is in motion, will be flowing in a more turbulent fashion across, and close to, the vehicle body 5. This generally occurs where the vehicle body 5 and components of the vehicle 1 act on the airflow in an abrupt, discontinuous manner meaning that the airflow disconnects from running smoothly over, and close to, the vehicle 1. For example, to the rear of the roof of the vehicle (where present) if the roof has an abrupt change in direction, as generally occurs on a retractable roof vehicle, the vehicle has one or more components that disrupt the airflow running over the vehicle as described herein, and/or when the vehicle has no roof or the roof is retracted. In general, these tend to be regions near the longitudinal centreline of the vehicle.

The rearwardly moving airflow is therefore affected by the vehicle as the airflow moves across it. This leads to there being some areas towards the rear of the vehicle where the rearwardly moving airflow is less disrupted and some areas towards the rear of the vehicle where the rearwardly moving airflow is more disrupted. The wing 10 of the rear VAD 9 is more effective when acting on a rearwardly moving airflow that is less disrupted. However, the wing 10 of the rear VAD 9 can still generate drag even if it is being less effective due to acting on a rearwardly moving airflow that is more disrupted. Therefore, it would be advantageous if the wing 10 was shaped so that it generated less drag in areas where there is more disrupted airflow. Generally, this means reducing the width of a central region of the wing, where airflow is more disrupted, relative to the outer regions, where airflow is less disrupted.

The wing 10 has a length and a width. As shown in FIGS. 1, 2 and 3, the wing 10 is shown as having a variable width along the length of the wing 10. In the figures, the length of the wing is along the lateral direction of the vehicle and the width of the wing is along the longitudinal direction of the vehicle. The length of the wing extends across the width of the vehicle (side to side) and the width of the wing extends across the length of the vehicle (front to rear). The wing 10 can logically be divided into three regions along the length of the wing: a middle region 14 and outer regions 15 to either side of the middle region 14. The wing has been delimited in FIG. 1 into the middle and outer regions by dotted lines 16. The wing 10 has a reduced width within the middle region 14 relative to the outer regions 15. The middle region 14 may have a length the same or less than the length of the two outer regions. The length of the two outer regions 15 may be the same. The wing 10 may have curved portions within the outer regions. The wing 10 may be substantially straight within the middle region.

As shown in FIGS. 1 to 3, the wing 10 may have a variable reduced width within the middle region 14. The width of the wing 10 within the middle region 14 deviates from the width of the outer regions 15 where they directly abut to middle region 14 to a minimum width less than the width of the outer regions 15, and particularly less than the width of the outer regions 15 where those regions directly abut the middle region 14. The minimum width of the wing within the middle region 14 may be located at along the longitudinal centreline of the wing 10. The minimum width of the wing 10 within the middle region 14 may be located along the longitudinal centreline of the vehicle 1. The variation of the width of the wing 10 within the middle region 14 may be symmetrical to either side of the longitudinal centreline. The width of the wing 10 in the outer regions 15 may be greater than the width in the middle region 14.

The wing 10 has a front edge and a rear edge. The front edge facing generally towards the front of the vehicle 1 and the rear edge facing generally towards the rear of the vehicle 1. The wing 10 may be shaped so that within the middle region, the rear edge of the wing deviates towards the front edge of the wing. Thus, the reduced width within the middle region 14 is formed by the rear edge of the wing deviating towards the front edge of the wing. The rear edge of the wing comes closer to the front edge of the wing within the middle region 14. The front edge of the wing may be substantially straight within the middle region 14 or at least having a deviation towards or away from the rear edge of the wing 1 that is small in comparison to the deviation of the rear edge of the wing 1 towards the from edge. The reduction in width of the wing 10 within the middle region 14 may form a notched shape 18 in the rear edge of the wing 10. The profile of the rear edge of the wing within the middle region 14 may be generally semi-circular. Thus, the wing 10 is shaped so that, when the variable aerodynamic device is in the raised configuration and the vehicle is moving in a forward direction, the outer regions 14 of the wing 10 each present a larger surface area to a rearwardly moving airflow than the middle region 14.

As described herein, different parts of the vehicle 1 affect the flow of air over the vehicle 1 in different ways. The vehicle body 5 may be shaped so that, when the variable aerodynamic device 9 is in the lowered configuration and the vehicle 1 is moving in a forward direction, the vehicle body 5 generates a less disrupted rearwardly moving airflow over the outer regions 15 of the wing than over the middle regions 14 of the wing 10. The vehicle body 5 may be shaped so that, when the variable aerodynamic device 9 is in the raised configuration and the vehicle 1 is moving in a forward direction, the vehicle body 5 generates a less disrupted rearwardly moving airflow over the outer regions 15 of the wing than over the middle regions 14 of the wing 10. In this case, by having outer regions 15 of the wing that present a larger surface area to the airflow relative to the middle region 14, the wing 10 reduces the amount of drag generated by the wing in the middle region 14 where the airflow is less optimal for generating downforce and increases the amount of downforce generated by the wing in the outer regions 15 where the airflow is more optimal for generating downforce and so the benefit of downforce generation can outweigh the drag generation.

As described herein, the vehicle 1 may have one or more components that disrupt the flow of air over the vehicle and/or have a vehicle body shape that disrupts the flow of air over the vehicle. As shown in FIGS. 1 to 3, the vehicle 1 may be a roofless vehicle. This means that the occupant compartment 4 does not have a roof or other cover. The roofless design means that air flowing over the middle of the top surface of the vehicle 1 does not have a smooth, continuous exterior surface of the vehicle 1 to follow. For instance, the occupant compartment 4 dips down relative to the front bonnet 6 of the vehicle.

The vehicle 1 may also comprise projections 17 from the rear deck 8 of the vehicle 1. The vehicle 1 in FIGS. 1 to 3 comprises two projections, one to each side of the longitudinal centreline of the vehicle 1. These projections 17 may extend upwards from the vehicle body behind the occupant compartment 4. The projections 17 may house a rollover protection system for the occupant compartment 4. The projections 17 can further disrupt the flow of air over the middle of the top surface of the vehicle. The projections 17 may disrupt the airflow due to their generally straight, upward surface where the projections 17 meet the occupant compartment 4.

The vehicle 1 may comprise at least one airflow redirection device 20 in between the front of the vehicle 1 and the occupant compartment 4. The airflow redirection device 20 is configured to change the direction of a rearwardly moving airflow over the vehicle body 5 to reduce the airflow through the occupant compartment 4 of the vehicle 1. In FIGS. 1 to 3 the vehicle comprises two airflow redirection devices 20, one for each of the front occupants of the occupant compartment 4. As an alternative, only one airflow redirection device 20 could be used which runs across the width of the vehicle in front of the occupant compartment 4.

Figure 4:
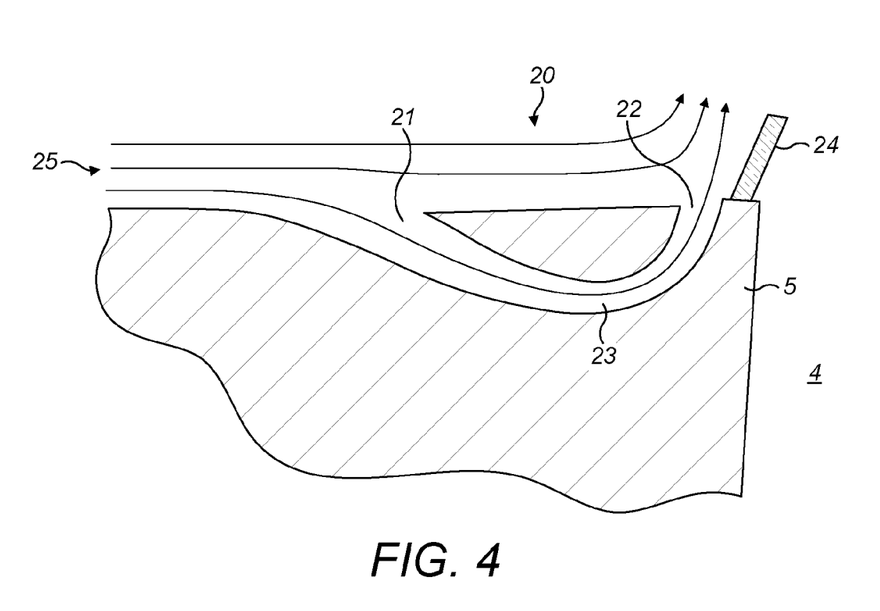
FIG. 4 shows an airflow redirection device.

An example airflow redirection device 20 is shown in FIG. 4. The airflow redirection device 20 comprises an inlet 21 and an outlet 22. The inlet 21 is positioned forward of the outlet 22. The inlet 21 is connected to the outlet 22 by a duct 23 to permit air flowing into the inlet 21 to be channeled to the outlet 22. The inlet 21 is configured to direct a rearward airflow 25 into the duct 23. The inlet 21 may be formed by a recess in the vehicle body 5 into which air can flow the duct 23 then closing the top of the inlet to enclose the air flowing into the inlet 21. The duct 23 channels the air flowing through the duct 23 from flowing in a generally horizontal direction to flowing in a generally vertical direction. The outlet 22 is oriented to direct the airflow originating from the duct 23 in a generally vertical direction. The vertical airflow exiting the outlet 22 causes rearward airflow that did not enter the inlet 21, and flowed over the surface of the vehicle body 5, to be directed upwards away from the occupant compartment 4.

The airflow direction device 20 is one such device that causes a disruption to a rearward airflow over the middle region of the vehicle body 5. This is because in forcing the airflow upwards away from the occupant compartment 4 this causes a turbulent airflow over the occupant compartment 4 and the rear of the vehicle.

The vehicle 1 may comprise a stub-windscreen 24. The stub-windscreen 24 may be a projection from the vehicle body 5 in front of the occupant compartment 4. The stub-windscreen 24 may project only a short distance from the vehicle body 5, less than a normal windscreen. The stub-windscreen 24 may project from the vehicle body 5 by a distance less than that needed to cover the face of a normal sized occupant in the occupant compartment. The stub-windscreen 24 may also cause a rearwardly moving airflow to be directed over the occupant cabin, again disrupting the rearward flow of air over the middle of the vehicle 1.

The reduction of the width in the middle region 14 of the wing 10 may be used to assist with packaging problems of the vehicle 1. The reduction in width may form an aperture in the vehicle body 5. The vehicle 1 may comprise a combustion engine, shown generally at 26 below the illustrated vents. The vehicle 1 may be a mid- or rear-engined vehicle. The combustion engine produces exhaust gasses that are channeled into one or more exhaust pipes by one or more exhaust manifolds. The exhaust gases flow out of the exhaust pipes at one or more exhaust outlets. The vehicle 1 may comprise an exhaust outlet located in the aperture. As shown in FIGS. 1 to 3, the vehicle 1 may comprise two exhaust outlets located in the aperture. The exhaust outlets located in the aperture may be oriented in a generally upward direction. The vehicle 1 may also comprise two exhaust outlets 27 in the rear end of the vehicle body 1. The two exhaust outlets 27 in the rear end may be oriented in a generally rearward direction.

Figure 5A:
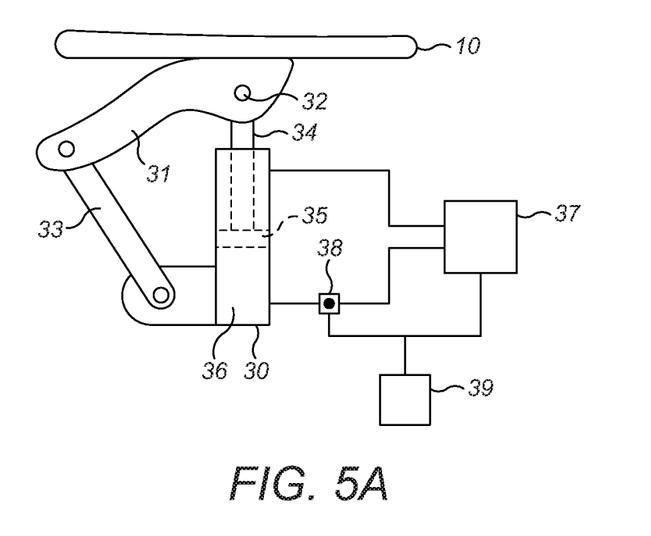
FIGS. 5A and B shows an example actuator mechanism for the rear variable aerodynamic device.
Figure 5B:
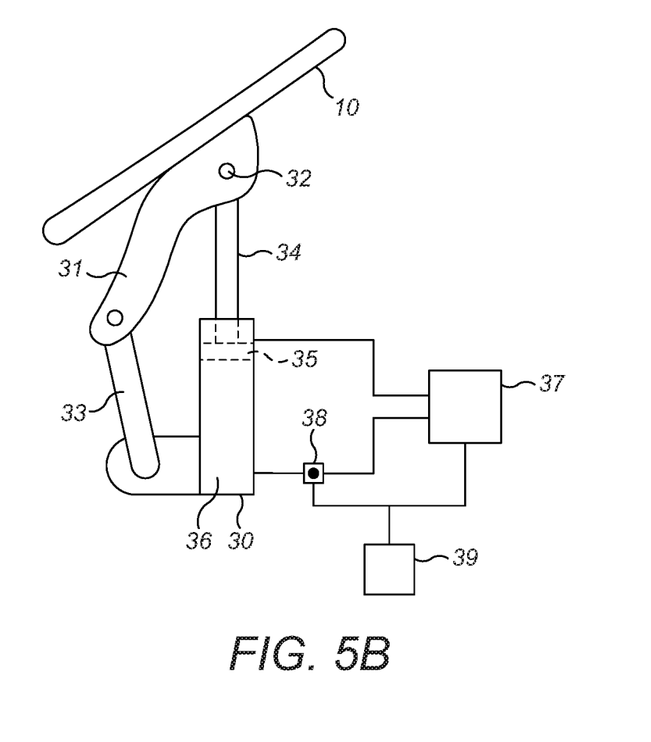

FIGS. 5A and B shows an example actuator mechanism 11 for the VAD 9. As shown in FIG. 3, the VAD may comprise two actuator mechanisms 11 located to each side of the VAD 9. The actuator mechanism 11 is attached to wing 10 to move the wing between a lowered position, shown in FIG. 5A, and a raised position, shown in FIG. 5B. The actuator mechanism 11 comprises an actuator 30. The actuator 30 is a linear actuator. The linear actuator is pivotally coupled to a wing support 31 at a first position 32 on the wing support. The wing support 31 is attached to wing 10 so that when the wing support 31 is moved the wing 10 moves with the wing support 31. The wing support 31 is also pivotally coupled to a linkage 33 at a second position on the wing support. The second position being forward of the first position. The linkage is also pivotally attached to the vehicle body, this may be via a connection to the actuator 30 as shown in FIGS. 5A and 5B. The connection of the wing support 31 to the actuator 30 and the linkage 33 is such that a movement of the first position, caused by the actuator 30, causes the second position to move rearwardly. This also causes a rotation of the wing support about the first location and thus also causes a rotation of wing 10 in addition to a raising or lowering of the wing 10.

The linear actuator 30 may be a hydraulic ram. The linear actuator 30 comprises a piston rod 34 and a cylinder 36. As shown in FIG. 4, the piston rod 34 is attached to piston 35. The piston 34 is moveable along the length of the cylinder 36. As the piston rod 34 is coupled to the piston 35, the piston 35 moves with the piston rod 34. As shown in FIG. 3A, the piston rod 34 is coupled to the wing support 31 at the distal end of the piston rod 34. The actuator 30 is connected to a hydraulic supply 37. The hydraulic supply 37 could come from another part of the vehicle 1, for example from its clutch hydraulics, or less preferably its brake hydraulics. One of the connections is provided with a variable restriction 38 to adjust the flow of fluid through the connection. The activation of the VAD may be controlled by controller 39. The controller 39 may be part of a more general vehicle controller.

As shown in FIG. 3, the vehicle 1 comprises a pair of actuator mechanisms located to each side of the VAD 9. In this case, there are two linear actuators with respective wing supports 31 and linkages 33. The two linear actuators 30 are connected to the same hydraulic supply 37 with one variable restriction 38 that controls the flow of fluid through the connection to both linear actuators 30. In this case, it can be difficult to control the exact actuation of each of the linear actuators because as the fluid flows past the variable restriction it may be that the fluid flows into one actuator before flowing into the other. This would lead to a staggered movement of the two actuators. This problem is solved by the wing running across the vehicle from one actuator to the other. The wing therefore links the two linear actuators together so that they move in unison to cause the wing to move between the lowered position and the raised position. As the two linear actuators need to be linked together to cause unified motion, the wing described herein is beneficial because it provides the mechanical linkage whilst minimising the drag generated by the middle region of the wing that mechanically links the two downforce producing regions, the outer regions, together.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle, comprising:
   a vehicle body having a rear; and
   a variable aerodynamic device positioned at the rear of the vehicle body and being moveable between a lowered configuration and a raised configuration, the variable aerodynamic device comprising: a wing divided along its length into a middle region and outer regions to either side of the middle region, the wing having a reduced width within the middle region relative to the outer regions, and the wing forming part of an outer surface of the vehicle body when the variable aerodynamic device is in the lowered configuration and raised from the vehicle body when the variable aerodynamic device is in the raised configuration;
   wherein the reduced width within the middle region forms an aperture in the vehicle body, and the vehicle comprises an exhaust outlet located in the aperture.

2. The vehicle according to claim 1, wherein, the wing having a reduced width within the middle region so that, when the variable aerodynamic device is in the raised configuration, the middle region presents a smaller surface area to a rearward airflow than each outer region.

3. The vehicle according to claim 1, wherein the wing has a variable reduced width within the middle region.

4. The vehicle according to claim 1, wherein the variation of the width of the wing within the middle region is symmetrical to either side of a longitudinal centreline of the vehicle.

5. The vehicle according to claim 1, wherein the width of the wing within the middle region deviates from the width of the outer regions where the outer regions abut the middle region to a minimum width less than the width of the outer regions.

6. The vehicle according to claim 5, wherein the minimum width is less than the width of the outer regions where the outer regions abut the middle region.

7. The vehicle according to claim 5, wherein the minimum width is located along the longitudinal centreline of the vehicle.

8. The vehicle according to claim 1, wherein the wing has a front edge and a rear edge, and the wing is shaped so that, within the middle region, the rear edge of the wing deviates towards the front edge of the wing.

9. The vehicle according to claim 8, wherein the front edge of the wing is substantially straight within the middle region.

10. The vehicle according to claim 8, wherein the reduced width of the wing within the middle region forms a notched shape in the rear edge of the wing.

11. The vehicle according to claim 1, wherein, when the variable aerodynamic device is in the raised configuration and the vehicle is moving in a forward direction, the outer regions are subjected to a less disrupted rearwardly moving airflow than the middle region.

12. The vehicle according to claim 1, wherein the vehicle body is shaped so that, when the vehicle is in forward motion, the vehicle body generates a less disrupted rearwardly moving airflow over the outer regions of the wing than over the middle region of the wing.

13. The vehicle according to claim 1, wherein the vehicle has a front, and the vehicle comprises a device located at the front of the vehicle which, when the vehicle is in forward motion, generates a stream of air which disrupts a rearwardly moving airflow over the vehicle body so that the outer regions are subjected to a less disrupted rearwardly moving airflow than the middle region.

14. The vehicle according to claim 1, wherein the vehicle comprises two exhaust outlets located in the aperture.

15. The vehicle according to claim 1, wherein the variable aerodynamic device has an actuation mechanism.

16. The vehicle according to claim 1, wherein the wing can rotate when the variable aerodynamic device moves between the lowered and raised configurations.

17. The vehicle according to claim 1, wherein the wing has curved portions within the outer regions.

18. The vehicle according to claim 1, wherein the vehicle is roofless.

19. The vehicle according to claim 1, further comprising one or more projections from a rear deck of the vehicle.

20. A vehicle, comprising:
a vehicle body having a rear;
a variable aerodynamic device positioned at the rear of the vehicle body and being moveable between a lowered configuration and a raised configuration, the variable aerodynamic device comprising: a wing divided along its length into a middle region and outer regions to either side of the middle region, the wing having a reduced width within the middle region relative to the outer regions, and the wing forming part of an outer surface of the vehicle body when the variable aerodynamic device is in the lowered configuration and raised from the vehicle body when the variable aerodynamic device is in the raised configuration; and
one or more projections from a rear deck of the vehicle.

* * * * *